United States Patent
Ma et al.

(10) Patent No.: US 10,928,940 B2
(45) Date of Patent: Feb. 23, 2021

(54) TOUCH PANEL, METHOD FOR MANUFACTURING THE SAME, AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Weijie Ma, Beijing (CN); Taofeng Xie, Beijing (CN); Tsung Chieh Kuo, Beijing (CN); Xianlin Ding, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/051,232

(22) Filed: Jul. 31, 2018

(65) Prior Publication Data
US 2019/0114012 A1   Apr. 18, 2019

(30) Foreign Application Priority Data
Oct. 12, 2017   (CN) .......................... 201710951709.3

(51) Int. Cl.
*G06F 3/041*   (2006.01)
*G06F 3/044*   (2006.01)

(52) U.S. Cl.
CPC ............ *G06F 3/0412* (2013.01); *G06F 3/044* (2013.01); *G06F 2203/04103* (2013.01); *G06F 2203/04104* (2013.01)

(58) Field of Classification Search
CPC .................. G06F 3/0412; G06F 3/044; G06F 2203/04103; G06F 2203/04104; G06F 3/0416; G06F 3/0418; G06F 3/043
(Continued)

(56) References Cited

U.S. PATENT DOCUMENTS

2008/0309633 A1\* 12/2008 Hotelling .............. G06F 3/0412
                                                                     345/173
2009/0246514 A1\* 10/2009 Chiu ..................... C23C 14/562
                                                                     428/336
(Continued)

FOREIGN PATENT DOCUMENTS

| CN | 103472945 A  | 12/2013 |
| CN | 203502946 U  | 3/2014  |
| JP | 3152611 U    | 8/2009  |

OTHER PUBLICATIONS

First Office Action issued in corresponding Chinese Application No. 201710951709.3, dated Jan. 6, 2020, with English translation.

*Primary Examiner* — Kent W Chang
*Assistant Examiner* — Sujit Shah
(74) *Attorney, Agent, or Firm* — McDermott Will & Emery LLP

(57) ABSTRACT

A touch panel includes a base substrate, a plurality of touch electrode blocks disposed at interval on the base substrate, and a plurality of shadow elimination portions each provided between any two adjacent touch electrode blocks in the plurality of touch electrode blocks. The plurality of shadow elimination portions and the plurality of touch electrode blocks are disposed in insulation from each other, and a difference between a reflectivity of one of the plurality of shadow elimination portions and a reflectivity of a corresponding one of the plurality of touch electrode blocks
(Continued)

adjacent to the one of the plurality of shadow elimination portions is within a threshold range.

14 Claims, 8 Drawing Sheets

(58) Field of Classification Search
USPC .................................................. 345/173–174
See application file for complete search history.

(56) References Cited

U.S. PATENT DOCUMENTS

| | | | |
|---|---|---|---|
| 2009/0315854 A1* | 12/2009 | Matsuo | G06F 3/044 345/174 |
| 2012/0075230 A1* | 3/2012 | Nagata | G06F 3/044 345/173 |
| 2015/0060125 A1* | 3/2015 | Stevenson | H05K 3/0023 174/261 |
| 2015/0185903 A1* | 7/2015 | Park | G06F 3/044 345/173 |
| 2015/0370395 A1* | 12/2015 | Hsu | G06F 3/0412 345/174 |
| 2016/0170515 A1* | 6/2016 | Liao | G06F 3/044 345/173 |
| 2016/0179255 A1* | 6/2016 | Yang | G09G 3/2092 345/173 |
| 2016/0202789 A1* | 7/2016 | Kim | G06F 3/044 345/174 |
| 2016/0202792 A1 | 7/2016 | Han et al. | |
| 2016/0378216 A1* | 12/2016 | Lee | G06F 3/041 345/173 |
| 2017/0115770 A1* | 4/2017 | Han | G06F 3/044 |

* cited by examiner

TOUCH PANEL, METHOD FOR MANUFACTURING THE SAME, AND TOUCH DISPLAY DEVICE

CROSS-REFERENCE TO RELATED APPLICATION

This application claims priority to Chinese Patent Application No. 201710951709.3, submitted to the Chinese patent office on Oct. 12, 2017, titled "TOUCH PANEL, METHOD FOR MANUFACTURING THE SAME, AND TOUCH DISPLAY DEVICE", which is incorporated herein by reference in its entirety.

TECHNICAL FIELD

The present disclosure relates to the technical field of display, and more particularly, to a touch panel, a method for manufacturing the same, and a touch display device.

BACKGROUND

Digital devices have become indispensable in people's life and production. A display device, as an output terminal of video signals of a digital device, is used for directly delivering information to the operator, and belongs to an indispensable device. With the development of science and technology, the display device is not limited to have a function of receiving and displaying video signals, but also has a control command input function, that is, an existing touch display device allows commands to be input directly through a screen to replace an auxiliary device for input such as a keyboard, thereby providing better convenience for users.

SUMMARY

A first aspect of the present disclosure provides a touch panel. The touch panel includes a base substrate, a plurality of touch electrode blocks disposed at interval on the base substrate, and a plurality of shadow elimination portions. Any two adjacent touch electrode blocks of the plurality of touch electrode blocks are provided with one of the plurality of shadow elimination portions therebetween. The plurality of shadow elimination portions and the plurality of touch electrode blocks are disposed in insulation from each other, and a difference between a reflectivity of one of the plurality of shadow elimination portions and a reflectivity of a corresponding one of the plurality of touch electrode blocks adjacent to the one of the plurality of shadow elimination portions is within a threshold range.

In some embodiments of the present disclosure, a material of the plurality of shadow elimination portions is an insulating material having a same reflectivity as the plurality of touch electrode block.

In some embodiments of the present disclosure, the touch panel further includes a plurality of first connection portions. Each of the plurality of first connection portions is used to electrically connect two adjacent touch electrode blocks of the plurality of touch electrode blocks in a first direction together. The plurality of shadow elimination portions and the plurality of first connection portions are in a same layer and made from a same material.

In some embodiments of the present disclosure, the plurality of shadow elimination portions and the plurality of touch electrode blocks are made from a same material.

In some embodiments of the present disclosure, the touch panel includes a plurality of insulation portions, each of the plurality of insulation portions is disposed between two adjacent touch electrode blocks of the plurality of touch electrode blocks, and rest surfaces of each of the plurality of shadow elimination portions are covered by a corresponding one of the plurality of insulation portions except a surface facing toward the base substrate.

In some embodiments of the present disclosure, the touch panel further includes a plurality of second connection portions. Each of the plurality of second connection portions is used to electrically connect two adjacent touch electrode blocks of the plurality of touch electrode blocks in a second direction together.

In some embodiments of the present disclosure, the plurality of second connection portions and the plurality of touch electrode blocks are in a same layer and made from a same material.

In some embodiments of the present disclosure, the plurality of shadow elimination portions are strip-shaped shadow elimination portions.

In some embodiments of the present disclosure, one of the strip-shaped shadow elimination portions includes a plurality of dotted shadow elimination sub-portions continuously or discontinuously arranged.

In some embodiments of the present disclosure, one of the strip-shaped shadow elimination portions includes a plurality of strip-shaped shadow elimination sub-portions continuously or discontinuously arranged.

In some embodiments of the present disclosure, the plurality of shadow elimination portions are strip-shaped shadow elimination portions, and the plurality of insulation portions are strip-shaped insulation portions.

In some embodiments of the present disclosure, the touch panel further includes a protective layer, and in the touch region, the protective layer merely covers the plurality of touch electrode blocks.

In some embodiments of the present disclosure, the protective layer is a single-layer thin film, and a material of the single-layer thin film includes silicon oxynitride. Alternatively, the protective layer is a two-layer thin film, a material of one layer of the two-layer thin film includes di-niobium pentoxide, and a material of another one layer of the two-layer thin film includes silicon dioxide.

In some embodiments of the present disclosure, the first direction is a longitudinal direction.

In some embodiments of the present disclosure, the second direction is a horizontal direction.

A second aspect of the present disclosure provides a touch display device. The touch display device includes a display panel and a touch panel, such as the touch panel described above.

A third aspect of the present disclosure provides a method for manufacturing a touch panel such as the touch panel described above. The method includes: forming a plurality of shadow elimination portions on the base substrate in a single patterning process; forming a transparent conductive material layer on the base substrate on which the preceding structure has been formed, and forming a plurality of touch electrode blocks disposed at interval in a single patterning process. Any two adjacent touch electrode blocks of the plurality of touch electrode blocks are provided with one of the plurality of shadow elimination portions therebetween.

In some embodiments of the present disclosure, the touch panel includes a plurality of first connection portions, a plurality of second connection portions and a plurality of insulation portions, and the method further includes: forming the plurality of first connection portions while forming the plurality of shadow elimination portions; forming an insulation material layer on the base substrate on which the plurality of shadow elimination portions and the plurality of first connection portions have been formed, and forming the plurality of insulation portions in a single patterning process, wherein rest surfaces of each of the plurality of shadow elimination portions are covered by a corresponding one of the plurality of insulation portions except a surface facing toward the base substrate; forming the plurality of second connection portions while forming the plurality of touch electrode blocks. Two adjacent touch electrode blocks of the plurality of touch electrode blocks in a first direction are electrically connected by one of the plurality of first connection portions, and two adjacent touch electrode blocks of the plurality of touch electrode blocks in a second direction are electrically connected by one of the plurality of second connection portions.

In some embodiments of the present disclosure, the method further includes: forming an insulating material layer on the base substrate on which the plurality of touch electrode blocks and the plurality of shadow elimination portions have been formed, and forming a protective layer in a single patterning process. In a touch region, the protective layer merely covers the plurality of touch electrode blocks.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

FIG. 3 is a schematic diagram of a structure of a touch panel having a plurality of first connection portions formed on the basis of FIG. 2a;

DETAILED DESCRIPTION

Technical solution in embodiments of the present disclosure is described clearly and completely below with reference to the accompanying drawings in the embodiments of the present disclosure. Apparently, the embodiments to be described are merely a part of the embodiments of the present disclosure, but not all of the embodiments. On the basis of the embodiments in the present disclosure, all other embodiments obtained by a person of ordinary skill in the art will fall into the protection scope of the present disclosure without paying any creative effort.

Hereinafter, the terms "first" and "second" are only used for descriptive purposes, and are not to be construed as indicating or implying a relative importance or implicitly indicating the number of technical features denoted. Thereby features defined with "first" or "second" can explicitly or implicitly include one or more of the features. In the description of the embodiments of the present disclosure, unless otherwise stated, "plurality" means two or more.

To realize the touch display, a touch panel is required. There are many kinds of processes for manufacturing the touch panel. One kind of process is to form an in-cell touch panel by using an In-Cell process. Another kind of process is to form an on-cell touch panel by using an On-Cell process. A further another kind of process is that the touch panel is also used as a cover glass by using a One Glass Solution (OGS) process, i.e., a pattern constituted by a plurality of touch electrode blocks is formed on a side of the cover glass close to the display panel. The plurality of touch electrode blocks are distributed evenly and disposed at interval. Users can see clearly the pattern of the touch electrode blocks in use.

Figure 1A:
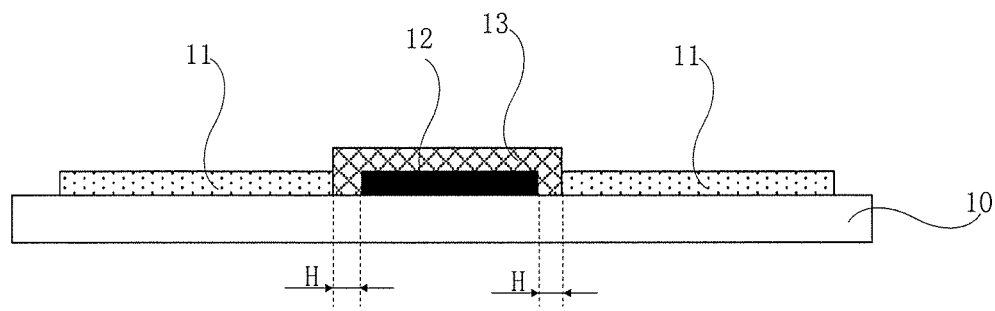
FIG. 1a is a schematic diagram of a partial structure of a touch panel according to some embodiments of the present disclosure.

On this basis, some embodiments of the present disclosure provide a touch panel 01. As shown in FIG. 1, the touch panel 01 includes a base substrate 10 and a plurality of touch electrode blocks 11, which are shown in FIG. 2a, disposed at interval on the base substrate 10.

In some embodiments, the touch panel 01 is a touch panel formed by using the OGS process, and the base substrate 10 for carrying the touch electrode blocks 11 serves as the above cover glass on which the touch sensor are provided. Under this circumstance, after the cover glass covers the display panel, the touch electrode blocks 11 are located on a surface of the cover glass close to the display panel.

Alternatively, the touch panel 01 is a touch panel formed by using the On-Cell process, and the base substrate 10 for carrying the touch electrode blocks 11 is a transparent cover at the display side of the display panel, e.g. a transparent substrate for supporting the color filter layer in a color film substrate. Under this circumstance, the touch electrode blocks 11 are located at a side of the transparent cover away from the display panel.

In some embodiments, the base substrate 10 is a glass substrate. In some other embodiments, a material from which the base substrate 10 is made is a transparent hard or flexible resin material, which is not limited in the present disclosure.

On this basis, the touch panel 01 further includes a plurality of shadow elimination portions 12 each is provided between two adjacent touch electrode blocks 11 in the plurality of touch electrode blocks 11. In some embodiments, any two adjacent touch electrode blocks 11 in the plurality of touch electrode blocks 11 are provided with one of the plurality of shadow elimination portions 12 therebetween.

The plurality of shadow elimination portions 12 and the plurality of touch electrode blocks 11 are disposed in insulation from each other, and a difference between a reflectivity of one of the shadow elimination portions 12 and a reflectivity of a corresponding one of the touch electrode blocks 11 adjacent to the one of the shadow elimination portions 12 is within a threshold range.

It will be noted that the description "a difference between a reflectivity of the shadow elimination portions 12 and a reflectivity of the touch electrode blocks 11 is within a range of thresholds" means that, within the scope of production accuracy or production requirements, the reflectivity of the shadow elimination portions 12 is approximately equal to or equal to the reflectivity of the touch electrode blocks 11. The above threshold range may be preset according to the actual requirements.

Alternatively, the threshold range may be adjusted as needed. For example, in a case that the pattern of the plurality of touch electrode blocks 11 is subjected to a high requirement of shadow elimination effect, in some embodiments, the threshold range is set as a small one, e.g. 0~3%. For example, in a case that the reflectivity of the touch electrode blocks is 80%, the reflectivity of the shadow elimination portions 12 ranges from 77% to 83%. On this basis, in a case that the difference between the reflectivity of the shadow elimination portions 12 and the reflectivity of the touch electrode blocks 11 is 0, the reflectivity of the shadow elimination portions 12 is identical to the reflectivity of the touch electrode blocks 11. In a case that the difference between the reflectivity of the shadow elimination portions 12 and the reflectivity of the touch electrode blocks 11 is greater than 3%, the difference therebetween is large, which is not favorable for satisfying the high requirement of the shadow elimination effect on the pattern of the touch electrode blocks 11. In some embodiments, the difference between the reflectivity of the shadow elimination portions 12 and the reflectivity of the touch electrode blocks 11 is 1% or 2%.

Alternatively, in a case that the pattern of the touch electrode blocks 11 is subjected to a low requirement of shadow elimination effect, in some embodiments, the threshold range is set as a large one, e.g. 0~5%. In a case that the difference between the reflectivity of the shadow elimination portions 12 and the reflectivity of the touch electrode blocks 11 is greater than 5%, the difference therebetween is large, thereby failing to achieve the purpose of eliminating the shadow of the pattern of the touch electrode blocks 11. In some embodiments, the difference between the reflectivity of the shadow elimination portions 12 and the reflectivity of the touch electrode blocks 11 may be 1%, 2%, and 4%.

In some embodiments, a material from which the touch electrode blocks 11 are made may be a transparent conductive material, such as Indium Tin Oxide (ITO) or Indium Zinc Oxide (IZO).

In order to make the reflectivity of the shadow elimination portions 12 closer to the reflectivity of the touch electrode blocks 11, in some embodiments, a material from which the shadow elimination portions 12 are made may be the same as the material from which the touch electrode blocks 11 are made. For example, the touch electrode blocks 11 are made from ITO, and the shadow elimination portions 12 are also made from ITO. Alternatively, the touch electrode blocks 11 are made from IZO, and the shadow elimination portion 12 are also made from IZO.

Alternatively, the material from which the shadow elimination portions 12 are made is an insulating material having a reflectivity as the same as the reflectivity (1.85%-2.0%) of the touch electrode blocks 11.

The shadow elimination portions 12 are for example strip-shaped shadow elimination portion.

Figure 2A:
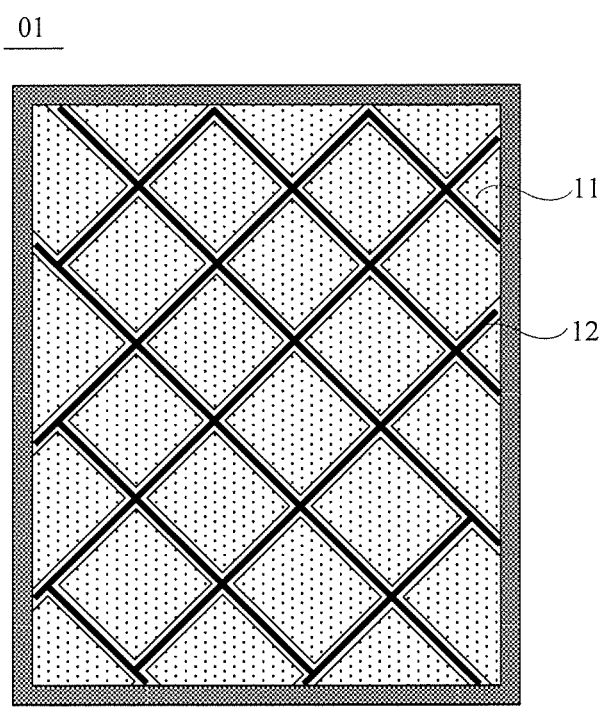
FIG. 2a is a top view of a touch panel according to some embodiments of the present disclosure.
Figure 2B:
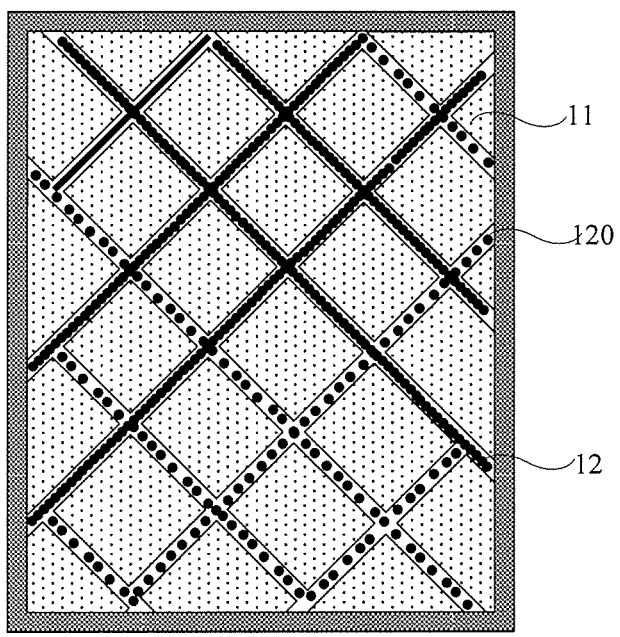
FIG. 2b is a top view of another touch panel according to some embodiments of the present disclosure.

In some embodiments, as shown in FIG. 2b, one of the strip-shaped shadow elimination portions (i.e., the shadow elimination portions 12) includes a plurality of dot-shaped shadow elimination sub-portions 120 continuously or discontinuously arranged.

Figure 2C:
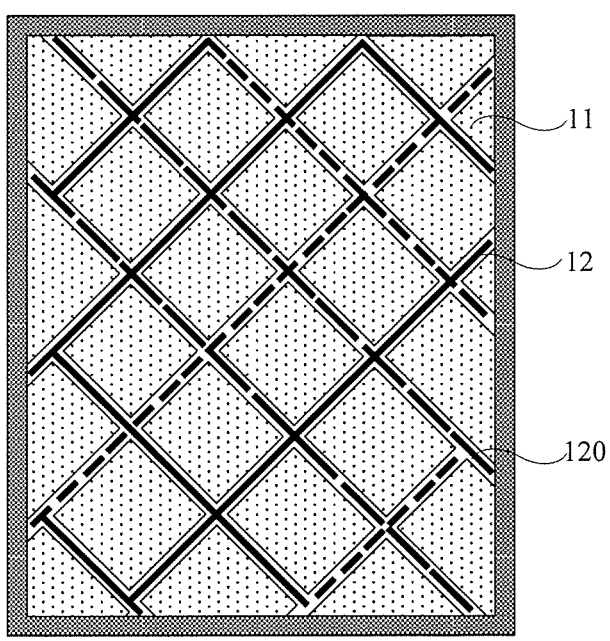
FIG. 2c is a top view of yet another touch panel according to some embodiments of the present disclosure.

In some other embodiments, as shown in FIG. 2c, one of the strip-shaped shadow elimination portions (i.e., the shadow elimination portions 12) includes a plurality of strip-shaped shadow elimination sub-portions 120 continuously or discontinuously arranged.

In the touch panel provided in the embodiments, two adjacent touch electrode blocks 11 are provided a shadow elimination portion 12 therebetween, and the shadow elimination portion 12 and the touch electrode blocks 11 are disposed in insulation from each other. In this way, even if the shadow elimination portion 12 and the touch electrode blocks 11 are made from the same material, the shadow elimination portion 12 will not have an influence on the touch function of the touch electrode blocks 11.

In addition, since the reflectivity of the shadow elimination portion 12 is approximately equal to or equal to the reflectivity of the touch electrode blocks 11, a portion (i.e., the shadow elimination portion 12) disposed between the touch electrode blocks 11, and the two adjacent touch electrode blocks 11 have an approximate or identical reflectivity. In this way, the pattern of the touch electrode blocks 11 is not easy to be recognized by human eyes, so as to achieve the effect of eliminating shadow of the touch electrode blocks 11.

On this basis, in order to make the shadow elimination portion 12 and the touch electrode blocks 11 disposed in insulation from each other, in some embodiments, as shown in FIG. 1 or FIG. 2a, there is a gap between each of the shadow elimination portions 12 and the touch electrode blocks 11 adjacent to it.

In addition, in order to further improve the insulation between the shadow elimination portion 12 and the touch electrode blocks 11, in some embodiments, as shown in FIG. 1, the touch panel further includes an insulation portion 13 disposed between two adjacent touch electrode blocks 11. Except a surface of the shadow elimination portion 12 facing toward the base substrate 10, the other surfaces of the shadow elimination portion 12 are covered by the insulation portion 13. Therefore, the shadow elimination portion 12 may be isolated from the touch electrode blocks 11 by the insulation portion 13.

In addition, in some embodiments, the shadow elimination portion 12 is a strip-shaped shadow elimination portion, and the insulation portion 13 is a strip-shaped insulation portion.

Figure 1B:
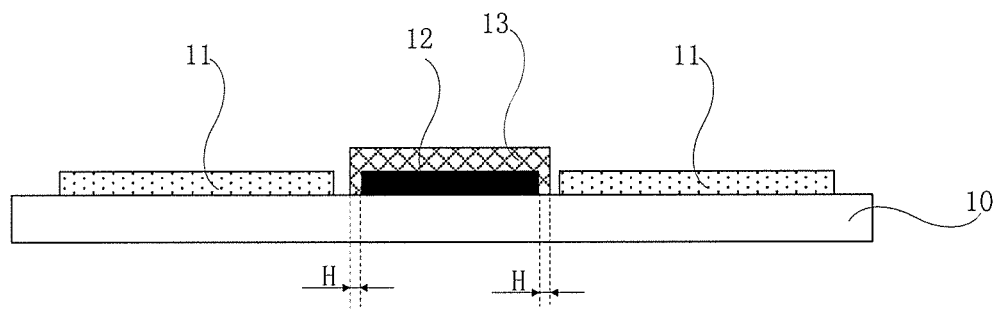
FIG. 1b is a schematic diagram of a partial structure of a touch panel according to some embodiments of the present disclosure.

In some embodiments, as shown in FIG. 1b, there is a gap between the insulation portion 13 and the touch electrode blocks 11. Alternatively, in some embodiments, a width H of a portion of the insulation portion 13 contacting the base substrate 10 is appropriately increased, for example, as shown in FIG. 1a, the width H is appropriately increased until the insulation portion 13 is capable to contact the touch electrode blocks 11. In this way, a size of an interval between the shadow elimination portion 12 and the touch electrode blocks 11 is increased, and a short circuit between the shadow elimination portion 12 and the touch electrode blocks 11 is prevented.

The material from which the insulation portion 13 is made is for example an insulating material, such as silicon nitride or silicon oxynitride.

Figure 3:
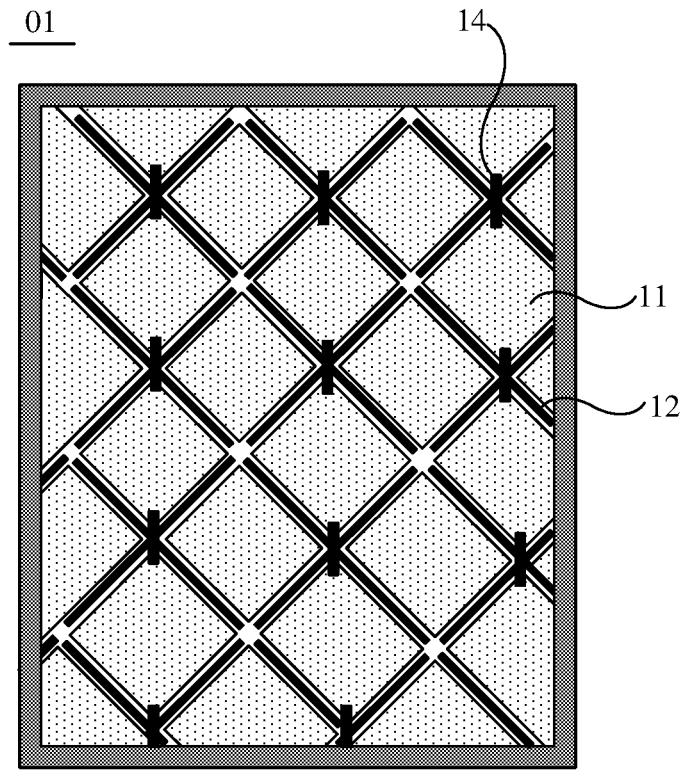
Figure 4:
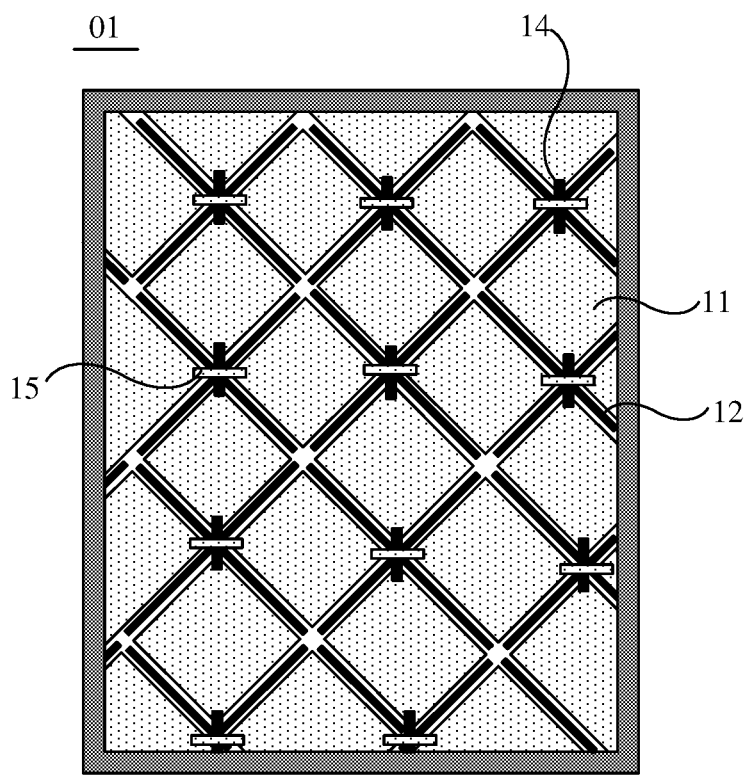
FIG. 4 is a schematic diagram of a structure of a touch panel having a plurality of second connection portions formed on the basis of FIG. 3.

In addition, in a process of touch control, a touch position touched by a finger of the user is positioned. Under this circumstance, as shown in FIG. 3, some of the plurality of touch electrode blocks 11 located in a same column are electrically connected to each other in a first direction, and as shown in FIG. 4, some of the plurality of touch electrode blocks 11 located in a same row are electrically connected to each other in a second direction. In this way, signals on each row and each column of touch electrode blocks 11 may be read through a data lead, and horizontal and vertical coordinates of the touch position may be obtained by judging the signal, thereby finally achieving the objective of determining the touch position.

It will be noted that, orientation terms of "first direction" and "second direction" herein are defined relative to the schematic placement orientation of the touch panel in the accompanying drawings. It will be understood that, these directionality terms are relative concepts used for relative description and explanation, and may be changed according to a change of an orientation in which the touch panel is placed.

In addition, the first direction intersects with the second direction. For example, the first direction is vertical and the second direction is horizontal, i.e., the first direction is perpendicular to the second direction.

To electrically connect the touch electrode blocks located in the same column along the first direction, as shown in FIG. 3, the touch panel 01 further includes a plurality of first connection portions 14. One of the plurality of first connection portions 14 are used to electrically connect two adjacent touch electrode blocks 11 together along the first direction.

To simplify the manufacturing process, in some embodiments, the shadow elimination portions 12 and the plurality of first connection portions 14 are in the same layer and made from the same material. In this way, the plurality of first connection portions 14 and the shadow elimination portion 12 may be formed in a single patterning process.

For example, ITO is adopted for the shadow elimination portions 12, the plurality of first connection portions 14 are also made from ITO.

It will be noted that, in some embodiments, the patterning process includes a mask process, or includes a mask process and an etching process, or further includes another process for forming predefined pattern such as printing and ink jet. The mask process refers to a process including the process of film forming, exposure, development, etc., for forming pattern using photoresist, mask plate, exposure machine, etc. A corresponding patterning process may be selected according to the structures formed in the embodiments of the present disclosure.

For the single patterning process in some embodiments, different exposure areas are formed through a single mask exposure process, and then the different exposure areas are subjected to a removal process such as multiple etching and ashing, thereby achieving an expected pattern.

In order to electrically connect the touch electrode blocks located in the same row in the second direction, in some embodiments, as shown in FIG. 4, the touch panel 01 further includes a plurality of second connection portions 15. One of the plurality of second connection portions 15 is used to electrically connect two adjacent touch electrode blocks 11 together in the second direction.

The plurality of second connection portions 15 and the touch electrode blocks 11 are in the same layer and made from the same material. In this way, the plurality of second connection portions 15 and the pattern of the touch electrode blocks 11 may be formed in a single patterning process. Under this circumstance, the plurality of second connection portions 15 and the touch electrode blocks 11 are for example formed into a single body.

Figure 5:
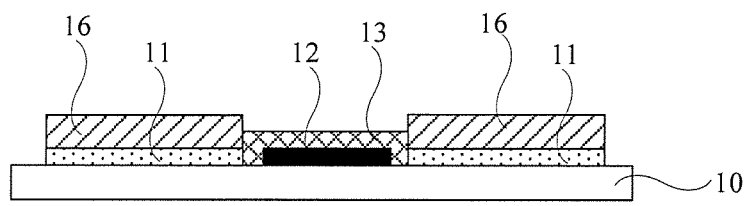
FIG. 5 is a schematic diagram of a partial section structure of yet a further touch panel according to some embodiments of the present disclosure.

In some embodiments, as shown in FIG. 5, the touch panel 01 further includes a protective layer 16 (Over Coat, OC), and in the touch region including all touch electrode blocks 11, the protective layer 16 merely covers the touch electrode blocks 11.

In order to further improve the shadow elimination effect on the pattern of the touch electrode blocks 11, in some embodiments, the protective layer 16 is a single-layer thin film, and a material from which the protective layer 16 is made includes silicon oxynitride ($SiO_XN_Y$).

Figure 6:
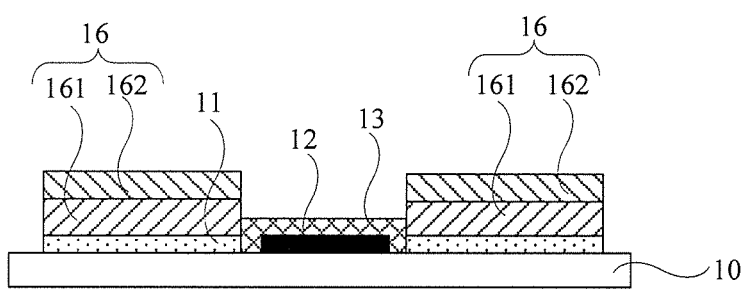
FIG. 6 is a schematic diagram of a partial section structure still a further touch panel according to some embodiments of the present disclosure.

Alternatively, as shown in FIG. 6, the protective layer 16 is a two-layer thin film, and a material of one layer 161 of the two-layer thin film includes di-niobium pentoxide ($Nb_2O_5$), and a material of the other layer 162 of the two-layer thin film includes silicon dioxide ($SiO_2$).

In this way, in a case that only the touch electrode blocks 11 are covered by the protective layer 16 of the above material and structure, the protective layer 16 has a high refractive index, thereby light transmitted from the touch electrode blocks 11 may be scattered by the protective layer 16. In this situation, the reflectivity at a groove surrounded by the adjacent touch electrode blocks 11 is closer to the reflectivity of the touch electrode blocks 11, so as to reduce the probability of recognizing the pattern of the touch electrode blocks 11 by human eyes.

Figure 7:
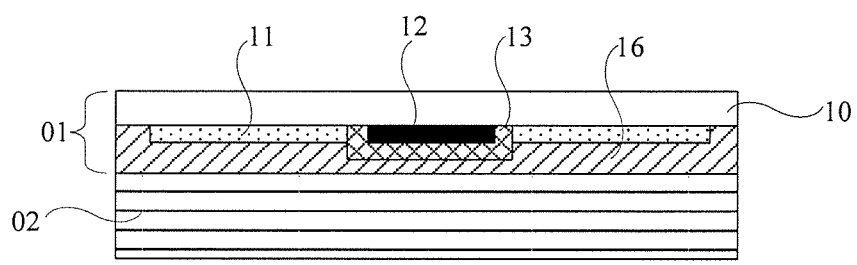
FIG. 7 is a schematic diagram of a structure of a touch display device according to some embodiments of the present disclosure.

Some embodiments of the present disclosure provide a touch display device. As shown in FIG. 7, the touch display device includes a display panel 02 and the touch panels 01 as described above. The base substrate 10 of the touch panel 01, which serves as a cover glass of the touch display device, is located at an outermost side of the touch display device.

The above touch display device has the same technical effect as the touch panel 01 provided in the preceding embodiments, which will not be elaborated here.

In some embodiments, the display panel 02 is a liquid crystal display panel, and the touch display device having the display panel 02 is a liquid crystal touch display device. Alternatively, the display panel 02 is an organic light emitting diode display panel, and the touch display device having the display panel 02 is an organic light emitting diode touch display device.

The above touch display device may be any product or component having a display function such as a touch display, a touch TV, a touch phone and a touch tablet computer.

Figure 8A:
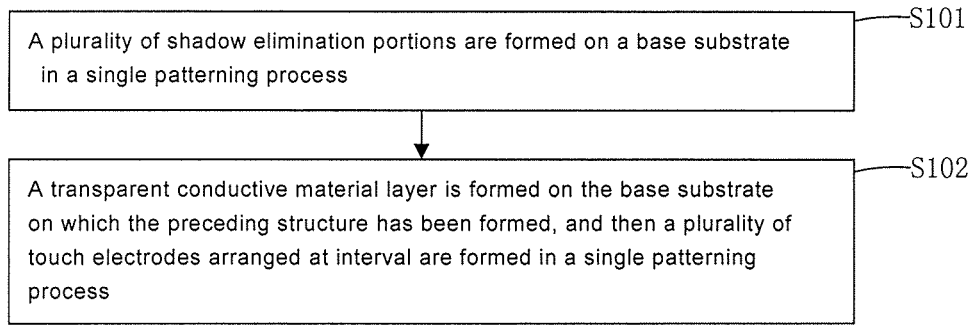
FIG. 8a is a flow diagram of a method for manufacturing a touch panel according to some embodiments of the present disclosure.

Some embodiments of the present disclosure provide a method for manufacturing a touch panel, such the touch panel 01 described above. As shown in FIG. 8a, the method includes S101-S102 (step 101-step 102).

In S101, a plurality of shadow elimination portions 12 are formed on a base substrate 10 in a single patterning process, as shown in FIG. 1.

In S102, a transparent conductive material layer is formed on the base substrate 10 on which the preceding structure has been formed, and then a plurality of touch electrode blocks 11 arranged at interval are formed in a single patterning process.

Each of the plurality of shadow elimination portions 12 is disposed between two adjacent touch electrode blocks 11.

Figure 8B:
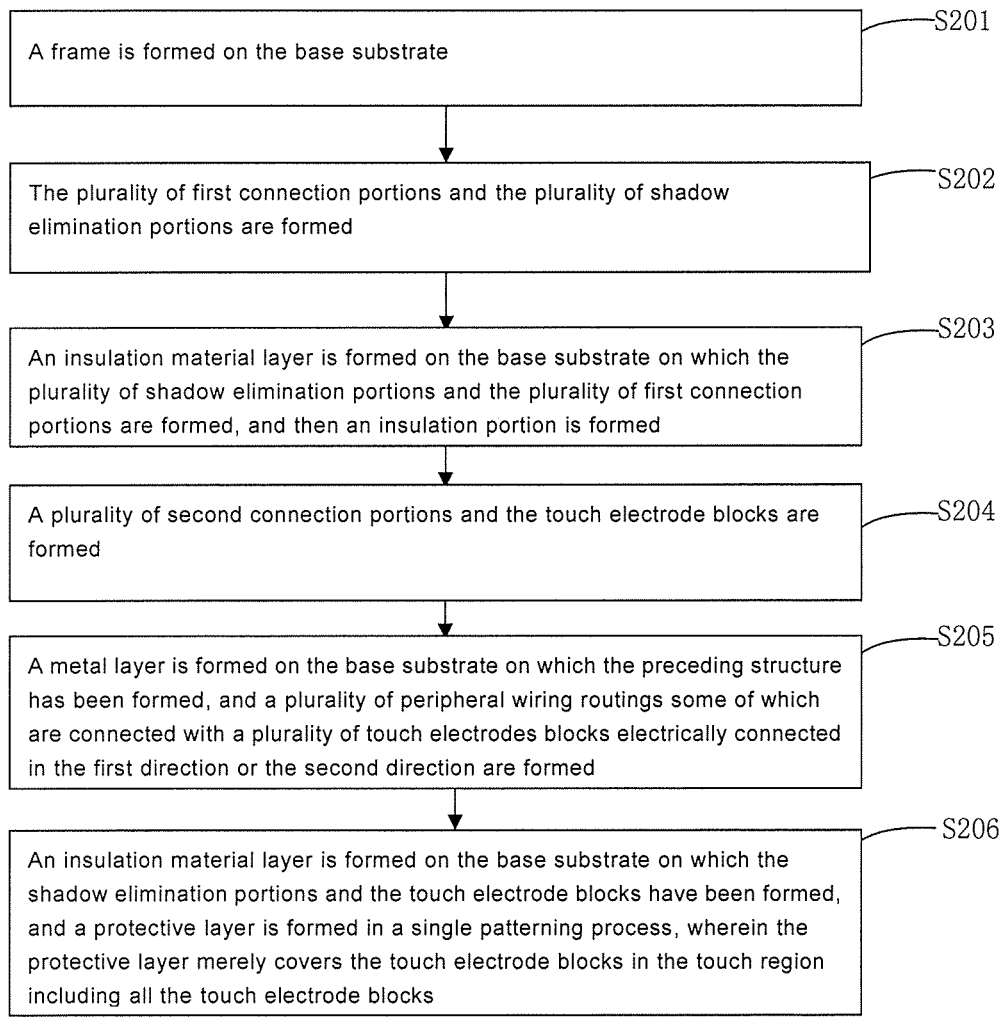
FIG. 8b is a flow diagram of another method for manufacturing a touch panel according to some embodiments of the present disclosure.

In some embodiments, the touch panel 01 includes a plurality of first connection portions 14, a plurality of second connection portions 15 and an insulation portion 13 as shown in FIGS. 4 and 5, and the method includes S201-S206 (step 201-step 206) as shown in FIG. 8b.

Figure 9:
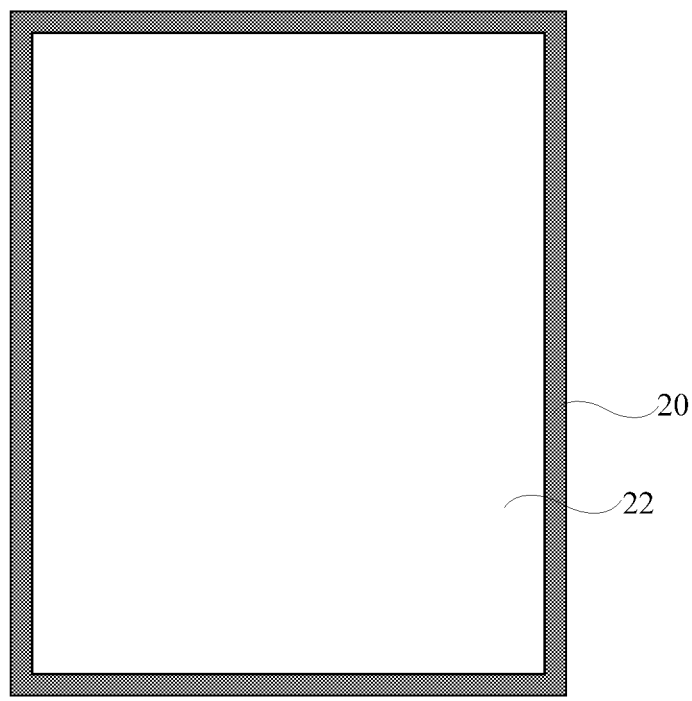
FIG. 9 is a schematic diagram of a structure achieved after S201 of FIG. 8b is completed.

In S201, a frame 20 shown in FIG. 9 is formed on the base substrate 10 shown in FIG. 1.

In some embodiments, S201 includes forming a layer of insulating material on the base substrate 10, e.g. a material used to make the frame, and then forming a pattern of the frame 20 in a first mask process. This frame is used to define a touch region 22 of the touch panel 01.

Figure 10:
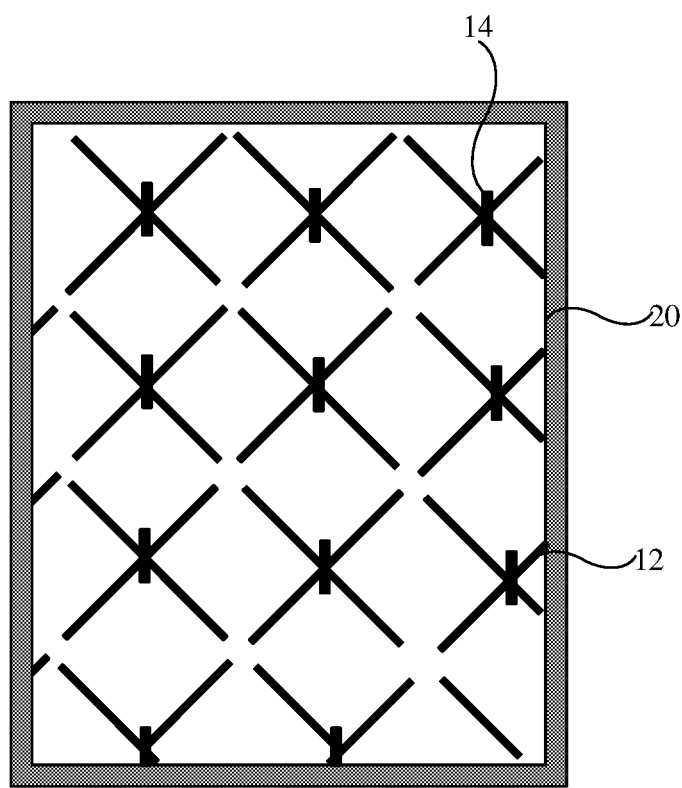
FIG. 10 is a schematic diagram of a structure achieved after S202 of FIG. 8b is completed.

In S202, a plurality of first connection portions 14 and a plurality of shadow elimination portions 12 shown in FIG. 10 are formed in a single patterning process, i.e., a second mask process.

Figure 11:
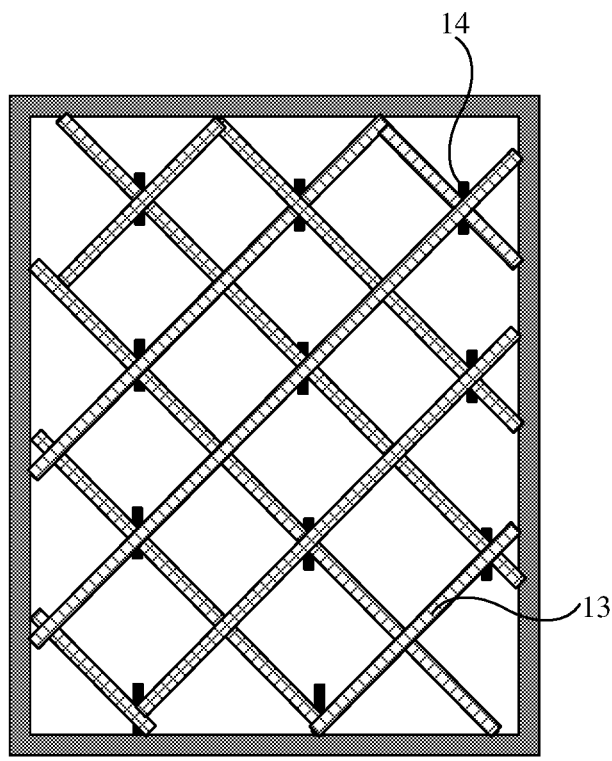
FIG. 11 is a schematic diagram of a structure achieved after S203 of FIG. 8b is completed.
Figure 12:
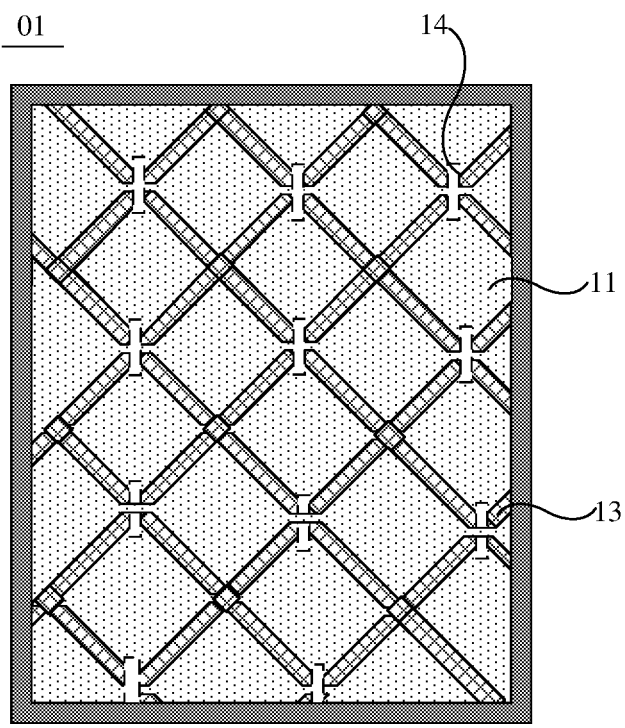
FIG. 12 is a schematic diagram of a structure achieved after S204 of FIG. 8b is completed.

In S203, an insulation material layer is formed on the base substrate 10 on which the plurality of shadow elimination portions 12 and the plurality of first connection sections 14 have been formed, and then a plurality of insulation portions 13 shown in FIG. 11 are formed in a single patterning process, i.e., a third mask process.

As shown in FIG. 1, except a surface of the shadow elimination portion 12 facing toward the base substrate 10, the other surfaces of the shadow elimination portion 12 are covered by the insulation portions 13. In addition, a part of the plurality of first connection portions 14 used for electrically connecting the touch electrode blocks 11 is unnecessary to be covered by the insulation portions 13.

In S204, a plurality of second connection portions 15 and the touch electrode blocks are formed in a single patterning process, i.e., a fourth mask process.

Two adjacent touch electrode blocks 11 are electrically connected by one of the plurality of first connection portions 14 in a first direction, and two adjacent touch electrode blocks 11 are electrically connected by one of the plurality of second connection portions 15 in a second direction.

Figure 13:
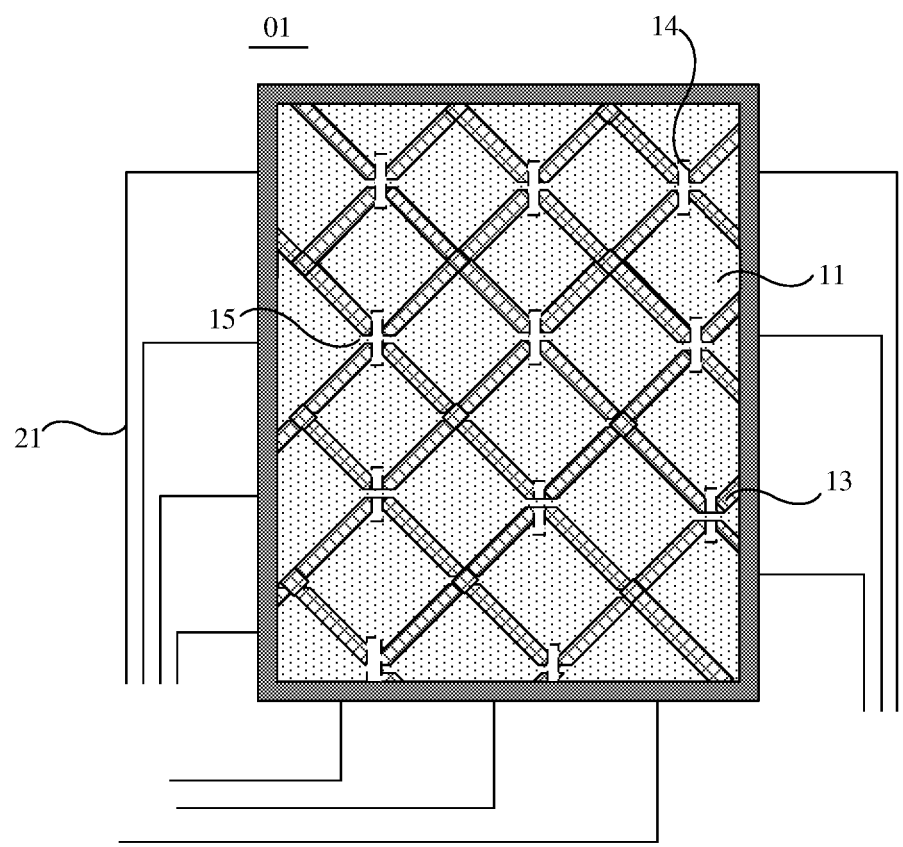
FIG. 13 is a schematic diagram of a structure achieved after S205 of FIG. 8b is completed.

In S205: a metal layer is formed on the base substrate 10 on which the preceding structure has been formed, and a plurality of peripheral routings 21 shown in FIG. 13, some of which are connected with a plurality of touch electrode blocks 11 electrically connected in the first direction or in the second direction, are formed in a single patterning process, i.e., a fifth mask process.

One of the above peripheral routings 21 may transmit, as a data lead wire, a touch signal on the touch electrode blocks 11 to a driving chip mounted outside the touch region 22.

In order to avoid too many data lead wires located in a same layer, which is not conducive to arrange the routings, in some embodiments, data lead wires connected with the plurality of touch electrode blocks 11 electrically connected in the second direction and data lead wires connected with the plurality of touch electrode blocks 11 electrically connected in the first direction are all made of metals which are arranged in different layers. Under this circumstance, the S205 is for example performed twice to prepare data lead wires located in different layers.

In S206, an insulation material layer is formed on the base substrate 10 on which the shadow elimination portions 12 and the touch electrode blocks 11 have been formed, and a protective layer 16 shown in FIG. 5 or FIG. 6 is formed in a single patterning process, i.e., a sixth mask process. The protective layer 16 merely covers the touch electrode blocks 11 in the touch region 22 including all the touch electrode blocks 11.

In addition, at the periphery of the touch region 22, the protective layer 16 is provided with an opening at least on a binding region of the touch panel 01. In this way, the driving chip may be bound to the touch panel 01 through the opening.

In some embodiments, the S206 is adopted to form the protective layer 16 which is a single-layer thin film shown in FIG. 5, and the insulating material layer formed in the S206 is a single-layer thin film. In some other embodiments, the step S206 is adopted to form the protective layer 16 which is a two-layer thin film shown in FIG. 6, and the insulating material layer formed in the step S206 is a two-layer thin film.

As can be seen from the above, the touch panel 01 may be manufactured through six mask processes, and the method for manufacturing the touch panel 01 has the same technical effect as the touch panel 01 provided in the preceding embodiments, which will not be elaborated here.

The above are merely some embodiments of the disclosure, but the protection scope of the disclosure is not limited thereto. Any changes or modifications that are readily apparent to those skilled in the art within the scope of the present disclosure are intended to be included within the scope of the present disclosure. Therefore, the protection scope of the disclosure shall be determined by the protection scope of the claims.

What is claimed is:

1. A touch panel, comprising:
a base substrate;
a plurality of touch electrode blocks disposed at interval on the base substrate;
a plurality of shadow elimination portions, wherein any two adjacent touch electrode blocks of the plurality of touch electrode blocks are provided one of the plurality of shadow elimination portions therebetween, and the plurality of shadow elimination portions and the plurality of touch electrode blocks are disposed in insulation from each other, and a difference between a reflectivity of one of the plurality of shadow elimination portions and a reflectivity of a corresponding one of the plurality of touch electrode blocks adjacent to the one of the plurality of shadow elimination portions is within a threshold range; and
a protective layer, wherein in a touch region, the protective layer covers only the plurality of touch electrode blocks, and
the protective layer is a two-layer thin film, a material of one layer of the two-layer thin film comprises diniobium pentoxide, and a material of another layer of the two-layer thin film comprises silicon dioxide;
a plurality of first connection portions each being used to electrically connect two adjacent touch electrode blocks of the plurality of touch electrode blocks in a first direction together, wherein the plurality of shadow elimination portions and the plurality of first connection portions are in a same layer and made from a same material; and
a plurality of insulation portions each been disposed between two adjacent touch electrode blocks, wherein the plurality of insulation portions covers only the plurality of shadow elimination portions, and a material of the protective layer is different from that of the plurality of insulation portions.

2. The touch panel according to claim 1, wherein, materials of the plurality of shadow elimination portions are insulating materials having a same reflectivity as the plurality of touch electrode blocks.

3. The touch panel according to claim 1, wherein, the plurality of shadow elimination portions and the plurality of touch electrode blocks are made from a same material.

4. The touch panel according to claim 1, further comprising a plurality of second connection portions each being used to electrically connect two adjacent touch electrode blocks of the plurality of touch electrode blocks in a second direction together.

5. The touch panel according to claim 4, wherein, the plurality of second connection portions and the plurality of touch electrode blocks are in a same layer and made from a same material.

6. The touch panel according to claim 1, wherein, the plurality of shadow elimination portions are strip-shaped shadow elimination portions.

7. The touch panel according to claim 6, wherein, one of the strip-shaped shadow elimination portions comprises a plurality of dotted-shaped shadow elimination sub-portions continuously or discontinuously arranged.

8. The touch panel according to claim 6, wherein, one of the strip-shaped shadow elimination portions comprises a plurality of strip-shaped shadow elimination sub-portions continuously or discontinuously arranged.

9. The touch panel according to claim 1, wherein, the plurality of shadow elimination portions are strip-shaped shadow elimination portions, and the plurality of insulation portions are strip-shaped insulation portions.

10. The touch panel according to claim 1, wherein, the first direction is a longitudinal direction.

11. The touch panel according to claim 4, wherein, the second direction is a horizontal direction.

12. A touch display device, comprising a display panel and the touch panel according to claim 1.

13. A method for manufacturing the touch panel according to claim 1, the method comprising:
forming a plurality of shadow elimination portions on a base substrate in a single patterning process;
forming a transparent conductive material layer on the base substrate on which the plurality of shadow elimination portions have been formed, and forming a plurality of touch electrode blocks disposed at interval in a single patterning process, wherein any two adjacent touch electrode blocks of the plurality of touch electrode blocks are provided with one of the plurality of shadow elimination portions therebetween;
forming an insulating material layer on the base substrate on which the plurality of touch electrode blocks and the plurality of shadow elimination portions have been formed, and forming a protective layer in a single patterning process, wherein in a touch region, the protective layer covers only the plurality of touch electrode blocks,
forming the plurality of first connection portions while forming the plurality of shadow elimination portions; and
forming an insulation material layer on the base substrate on which the plurality of shadow elimination portions and the plurality of first connection portions have been formed, and then forming the plurality of insulation portions in a single patterning process, wherein the plurality of insulation portions covers only the plurality of shadow elimination portions, and a material of the protective layer is different from that of the plurality of insulation portions.

14. The method according to claim 13, wherein the touch panel further comprises a plurality of first connection portions, a plurality of second connection portions and a plurality of insulation portions, and the method further comprises:
forming the plurality of second connection portions while forming the plurality of touch electrode blocks, wherein
two adjacent touch electrode blocks of the plurality of touch electrode blocks in a first direction are connected electrically by one of the plurality of first connection portions, and two adjacent touch electrode blocks of the plurality of touch electrode blocks in a second direction are connected electrically by one of the plurality of second connection portions.

* * * * *